US010017957B1

(12) United States Patent
Lee

(10) Patent No.: US 10,017,957 B1
(45) Date of Patent: Jul. 10, 2018

(54) METHOD FOR MANUFACTURING DOOR LEVER

(71) Applicant: YESKOREA CO., LTD., Sangju-si, Gyeongsangbuk-do (KR)

(72) Inventor: Sung Jin Lee, Sangju-si (KR)

(73) Assignee: YESKOREA CO., LTD., Sangju-si (KR)

( * ) Notice: Subject to any disclaimer, the term of this patent is extended or adjusted under 35 U.S.C. 154(b) by 0 days.

(21) Appl. No.: 15/889,655

(22) Filed: Feb. 6, 2018

(30) Foreign Application Priority Data

Apr. 13, 2017 (KR) .................. 10-2017-0048055

(51) Int. Cl.
| B23K 9/173 | (2006.01) |
| B21D 22/02 | (2006.01) |
| E05B 1/00 | (2006.01) |
| B24B 19/26 | (2006.01) |

(52) U.S. Cl.
CPC ............ *E05B 1/003* (2013.01); *B21D 22/02* (2013.01); *B23K 9/173* (2013.01); *B24B 19/26* (2013.01)

(58) Field of Classification Search
CPC ......... Y10T 29/49826; Y10T 29/49893; Y10T 29/49895; Y10T 29/49901; Y10T 29/49904; Y10T 29/49995; Y10T 29/49998
See application file for complete search history.

(56) References Cited

U.S. PATENT DOCUMENTS 3,400,446 A * 9/1968 Yulkowski ............... E05B 1/04
228/175
8,776,348 B2 * 7/2014 Gertig ................... B29C 45/006
29/458

FOREIGN PATENT DOCUMENTS

| CN | 102161066 A | 8/2011 |
| CN | 202047650 U | 11/2011 |
| CN | 103615147 A | 3/2014 |
| KR | 20-2010-0005273 U | 5/2010 |
| KR | 10-2012-0011132 A | 2/2012 |
| KR | 10-1207843 B1 | 12/2012 |
| KR | 10-2014-0073913 A | 6/2014 |

OTHER PUBLICATIONS

English Translation of CN 102161066 A.*
Response to the question "How to Remove Stains from a Stainless Hairline?," Naver Knowledge iN, published on-line Jul. 1, 2008 and printed Jan. 24, 2018.
Aluminum surface treatment, People on the island, http://blog.daum.net/llgyul/13448578, published online Dec. 6, 2007, printed Jan. 25, 2018.

* cited by examiner

*Primary Examiner* — Jason L Vaughan
(74) *Attorney, Agent, or Firm* — Novick, Kim & Lee, PLLC; Jae Youn Kim

(57) ABSTRACT

Provided is a method for manufacturing a door lever made of a stainless steel material having excellent corrosion resistance, not made of a metal material used typically to manufacture the door lever, so that even if it is exposed, during long-term use, to a coast area where large amounts of moisture and salt are collected in the air, it can be used without any corrosion.

1 Claim, 3 Drawing Sheets

METHOD FOR MANUFACTURING DOOR LEVER

CROSS REFERENCE TO RELATED APPLICATION OF THE INVENTION

The present application claims the benefit of Korean Patent Application No. 10-2017-0048055 filed in the Korean Intellectual Property Office on Apr. 13, 2017, the entire contents of which are incorporated herein by reference.

BACKGROUND OF THE INVENTION

Field of the Invention

The present invention relates to a method for manufacturing a door lever, and more particularly, to a method for manufacturing a door lever made of a stainless steel material having excellent corrosion resistance, not made of a metal material used typically to manufacture the door lever, so that even if the door lever is exposed, during long-term use, to a coast area where large amounts of moisture and salt are collected in the air, it can be used without any corrosion.

Background of the Related Art

Typically, a lever for a door lock is made by injecting molten zinc or aluminum by means of die casting.

For example, a conventional lever for a door lock is disclosed in Korean Patent Application No. 10-2012-0141941 entitled "method for manufacturing lever for door lock and lever for door lock". According to the conventional practice, a lever and a latch are made of a zinc or aluminum material by means of die casting, and especially, titanium dioxide or ceramic powder is mixed to the zinc or aluminum material to achieve electrostatic discharging effects and far-infrared emission effects.

However, if the lever for the door lock made of the zinc or aluminum material is used in a coast area where large amounts of moisture and salt are collected in the air, it may become gradually corroded.

So as to mold stainless steel having excellent carrions resistance to a desired shape, on the other hand, the molding method is dependent upon die casting wherein the stainless steel is molten and molded by casting. In case of the molding method, however, a molding process is complicated and a product is easily deformed according to environmental causes in the manufacturing process, thereby undesirably causing inefficiencies of production and remarkable decrement in the quality of product.

So as to solve the above-mentioned problems, accordingly, there are conventional technologies providing a feeling like a stainless steel material using a steel material like zinc or aluminum, and for example, one of the conventional technologies is disclosed in Korean Patent Application No. 10-2010-0072724 entitled "door handle having feeling of stainless steel and method for manufacturing the same". According to the conventional technology, a grasping part and a fixing plate are molded using a steel material like zinc or aluminum, and next, a gray metal plating layer is formed on the molded product. While hairline patterns are being formed on the plating layer, after that, a transparent resin layer is formed on the plating layer.

Even in case of the conventional technology, however, the general steel material having low corrosion resistance is molded to make the lever, and so as to induce the color of the stainless steel from the molded lever, further, the gray metal plating layer like nickel, zinc, chrome and so on is just formed.

That is, the conventional technology just imitates the color and texture of the stainless steel and further does not expect corrosion prevention effects the stainless steel has. In addition, the conventional technology further includes the steps of producing the gray metal plating layer to induce the color and texture of the stainless steel from the steel material, laminating the plating layer on the surface of the steel material, forming the hairline pattern on the steel material on which the plating layer is laminated, and coating the transparent resin layer on the steel material on which the hairline pattern is formed, so that due to the unnecessarily complicated steps, undesirably, personnel and manufacturing costs are raised and low productivity is caused.

Accordingly, there is a definite need for the development of a new technology capable of manufacturing a door lever made of stainless steel to improve corrosion resistance.

SUMMARY OF THE INVENTION

Accordingly, the present invention has been made in view of the above-mentioned problems occurring in the prior art, and it is an object of the present invention to provide a method for manufacturing a door lever that is capable of pressurizing and molding a stainless steel material by means of a press mold to manufacture the door lever having improved corrosion resistance.

It is another object of the present invention to provide a method for manufacturing a door lever that is capable of polishing weld beads or residual stress on surfaces generated in the process of welding a left body piece and a right body piece made to shapes corresponding to each other by means of press machining, through hairline finishing, thereby providing more excellent polishing technique than existing hairline finishing techniques to improve the outer appearance of the door lever.

To accomplish the above-mentioned objects, according to a first aspect of the present invention, there is provided a door lever made of a stainless steel material and including a left body piece and a right body piece made to shapes corresponding to each other by means of press machining in such a manner as to be bonded unitarily to each other by means of welding and a manipulator interposed in a space between the left body piece and the right body piece in such a manner as to be welded to the left body piece and the right body piece to take a shape of a single lever.

According to the present invention, desirably, the left body piece and the right body piece have the shapes divided in a longitudinal direction of the lever to be machined.

To accomplish the above-mentioned objects, according to a second aspect of the present invention, there is provided a method for manufacturing a door lever, the method including: the press machining step of individually machining a left body piece and a right body piece by means of a press machine; the body arrangement step of arranging the left body piece and the right body piece press-machined to face each other; the manipulator interposing step of placing a manipulator in a space between the left body piece and the right body piece facingly arranged in such a manner as to be interposed between front ends of the left body piece and the right body piece; the body contacting step of positioning the left body piece and the right body piece so that the left body piece and the right body piece come into close contact with each other through the manipulator; and the body coupling step of performing welding on the boundary between the left body piece and the right body piece contacted with each other in such a manner as to allow the left body piece and the right body piece to be formed unitarily with each other to surround the manipulator.

According to the present invention, desirably, the body coupling step further comprises the body post-machining step of forming a hairline on the boundary between the left body piece and the right body piece welded to each other and polishing the surfaces of the left body piece and the right body piece.

According to the present invention, desirably, the body post-machining step comprises: the degreasing step of submerging the left body piece and the right body piece into a 0.5 M sodium hydroxide solution maintained to a temperature of 60 to 70° C. to remove foreign substances and oil components from the left body piece and the right body piece; the polishing step of spraying a polishing liquid made by mixing a 20 g compound per 1 L water onto the bonded portion between the left body piece and the right body piece and removing burrs generated on the bonded portion and residual stress on the surfaces of the left body piece and the right body piece by means of polishing stone; and the water removing step of spraying ethanol onto the left body piece and the right body piece completely polished to induce the evaporation of the ethanol and thus to perform water removal and antibacterial treatment.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
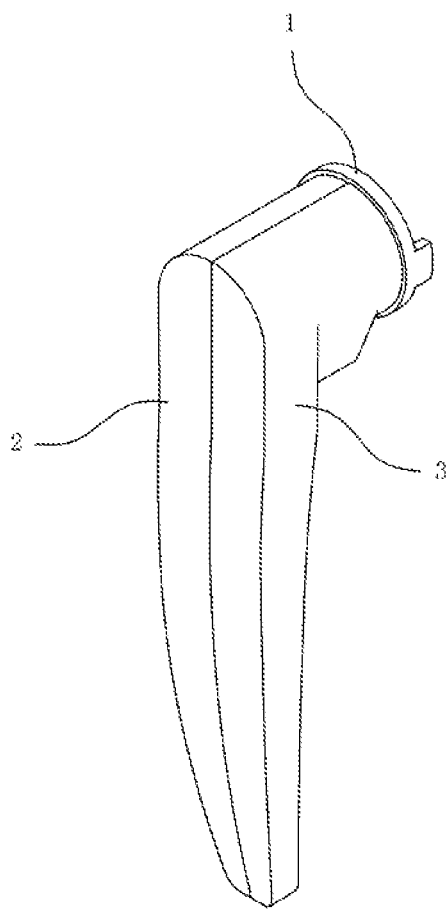
FIG. 1 is a perspective view showing a door lever according to the present invention.

Hereinafter, an explanation on a configuration, operation, and effects of the present invention will be given with reference to the attached drawings.

Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims. The corresponding parts in the embodiments of the present invention are indicated by corresponding reference numerals.

The present invention relates to a method for manufacturing a door lever, and according to the present invention, the door lever is made of a stainless steel material having excellent corrosion resistance, not made of a metal material used typically to manufacture the door lever, so that even if it is exposed to a coast area where large amounts of moisture and salt are collected in the air, it can be used without any corrosion or damage during long-term use.

Figure 2:
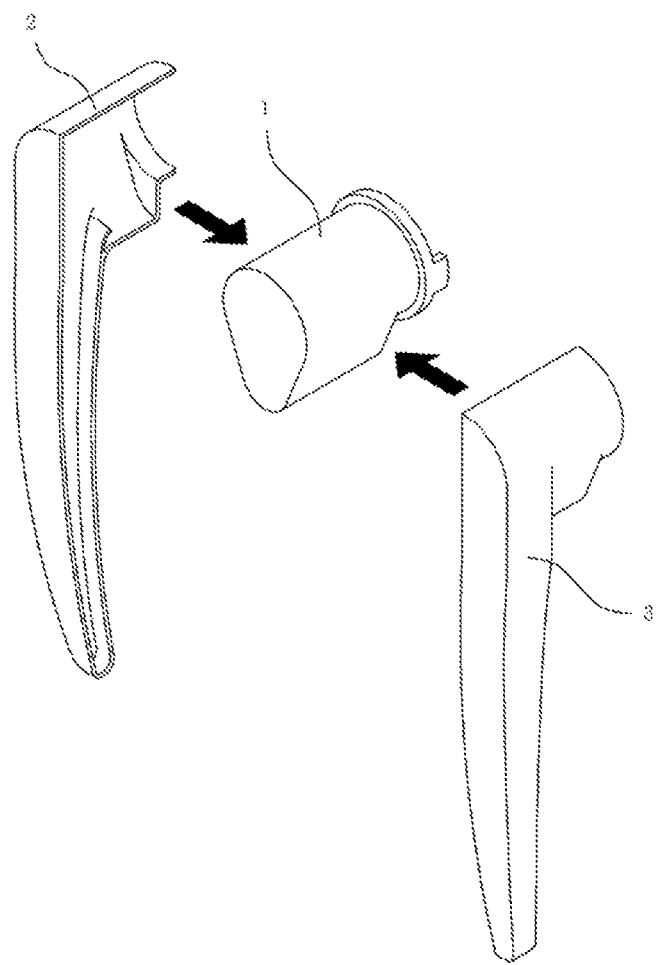
FIG. 2 is an exploded perspective view showing the door lever of FIG. 1.

FIG. 1 is a perspective view showing a door lever according to the present invention, wherein a door lever is made by pressurizing and molding a stainless steel material by means of a press, and FIG. 2 is an exploded perspective view showing the door lever of FIG. 1, wherein the door lever is made by interposing a manipulator 1 between a left body piece 2 and a right body piece 3 pressurized and molded by the press.

As shown in FIG. 1 or 2, the door lever according to the present invention is made of the stainless steel material and includes the left body piece 2 and the right body piece 3 made to the corresponding shapes to each other by means of press machining in such a manner as to be unitarily bonded to each other by means of welding and the manipulator 1 interposed between the left body piece 2 and the right body piece 3 in such a manner as to be bonded to them by means of welding to have a shape of a single lever.

Figure 3:
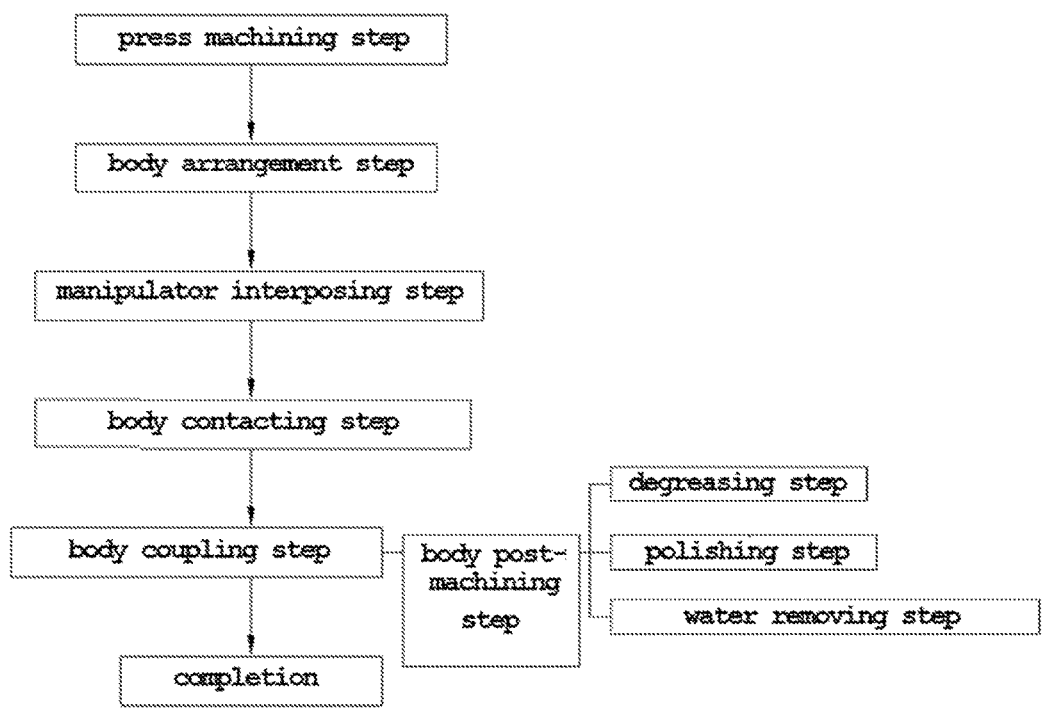
FIG. 3 is a flowchart showing a method for manufacturing a door lever according to the present invention.

FIG. 3 is a flowchart showing a method for manufacturing a door lever according to the present invention.

As shown in FIG. 3, a method for manufacturing the door lever according to the present invention includes the press machining step of individually machining the left body piece 2 and the right body piece 3 by means of the press, the body arrangement step of arranging the left body piece 2 and the right body piece 3 press-machined to face each other, the manipulator interposing step of placing the manipulator 1 in a space between the left body piece 2 and the right body piece 3 facingly arranged in such a manner as to interpose the manipulator 1 between front ends of the left body piece 2 and the right body piece 3, the body contacting step of positioning the left body piece 2 and the right body piece 3 so that the left body piece 2 and the right body piece 3 come into close contact with each other through the manipulator 1, and the body coupling step of performing welding on the boundary between the left body piece 2 and the right body piece 3 contacted with each other in such a manner as to allow the left body piece 2 and the right body piece 3 to be formed unitarily with each other to surround the manipulator 1.

The press machining step is the step of pressurizing and molding the stainless steel material to the left body piece 2 and the right body piece 3 of the door lever by means of a press mold, and in this case, the stainless steel material is desirably one selected from austenitic stainless steel STS304 (18-8 standard steel), ferritic stainless steel STS430 (18 chrome standard steel), and martensitic stainless steel STS410 (13 chrome standard steel). The stainless steel material is more desirably austenitic stainless steel STS304 (18-8 standard steel). However, the stainless steel material is not necessarily limited to the above.

The austenitic stainless steel STS304 (hereinafter, referred to as 'stainless steel') is located in the press mold having molding portions for the left body piece 2 and the right body piece 3 and is pressurizedly molded under a pressurizing force of 480 to 520 N/mm².

The body arrangement step is the step of removing the left body piece 2 and the right body piece 3 pressurized and molded from the press mold to arrange the left body piece 2 and the right body piece 3 in such a manner as to face each other. At this time, the left body piece 2 and the right body piece 3 are provided after their unnecessary portions except molded areas are cut.

The manipulator interposing step is the step of placing the manipulator 1 in a space between the left body piece 2 and the right body piece 3 facingly arranged through the body arrangement step to interpose the manipulator 1 between front ends of the left body piece 2 and the right body piece 3.

In the manipulator interposing step, particularly, the manipulator 1 is eccentric downwardly, and the manipulator 1 fixedly comes into close contact with the left body piece 2 and the right body piece 3 within a concaved space between the left body piece 2 and the right body piece 3. The manipulator interposing step has been already explained in FIG. 2.

The body contacting step is the step of positioning the facing sections of the left body piece 2 and the right body piece 3 at accurate locations, without any misalignment, in the state where the manipulator 1 is interposed between the left body piece 2 and the right body piece 3.

The body coupling step is the step of bonding the facing sections of the left body piece 2 and the right body piece 3 by means of a welding machine to prevent the facing sections from being open or deviated in the state where the facing sections of the left body piece 2 and the right body piece 3 are arranged at the accurate positions, so that the left body piece 2 and the right body piece 3 are formed unitarily with each other, while interposing the manipulator 1 therebetween, thereby finishing a shape of the door lever.

A welding method in the body coupling step includes one selected from shielded metal arc welding, inert gas tungsten arc welding (TIG welding), inert gas metal arc welding (MIG welding), and welding of chrome-nickel stainless steel, and after that, the welded lever is subjected to solution treatment at a temperature of 1100 to 1200° C. or heated to 850° C. or under and subjected to quenching (water toughening) to prevent the corrosion resistance on a portion where carbides precipitate by welding heat from being decreased.

On the other hand, the body coupling step further includes the body post-machining step of removing weld beads generated in a process of bonding the left body piece 2 and the right body piece 3 by means of the welding machine and the residual stress on the left body piece 2 and the right body piece 3.

The body post-machining step includes a degreasing step, a polishing step, and a water removing step, and after the steps are sequentially carried out, a hairline on the boundary between the left body piece 2 and the right body piece 3 welded to each other is formed. Next, the surface on which the hairline is formed is polished, thereby more improving the outer appearance of the door lever.

In more detail, the hairline is formed by welding the left body piece 2 and the right body piece 3 to each other, thereby making the outer appearance of the product deteriorated, and accordingly, the hairline is removed by polishing or cutting. According to the present invention, a portion where the hairline is formed is polished to a slit having a depth of 5 to 10 µm so as to manufacture the door lever having a perfect outer appearance. At this time, a step for applying lubricating oil to the entire surface of the left body piece 2 and the right body piece 3 to prevent a portion surrounding the portion where the hairline is formed from being scratched by chips scattered in the slit machining, which may be of course freely selected by a user. Even though the lubricating oil is applied, it does not matter to the degreasing step where the residual stress is removed.

The degreasing step is the step of removing the remaining foreign substances and oil components from the front surfaces of the left body piece 2 and the right body piece 3 by means of a sodium hydroxide solution. In more detail, a 0.5 M sodium hydroxide solution is heated and always maintained to a temperature of 60 to 70° C., and after that, the lever made by welding the left body piece 2 and the right body piece 3 is submerged into the 0.5 M sodium hydroxide solution maintained to the temperature of 60 to 70° C. for 30 to 60 minutes to completely remove the remaining foreign substances and oil components from the front surfaces of the left body piece 2 and the right body piece 3. At this time, if the degreasing step is carried out at a higher temperature than the temperature as mentioned above, heat load may be applied to the surface of the stainless steel, and contrarily, if the degreasing step is carried out at a lower temperature than the temperature as mentioned above, it is not perfectly carried out.

The polishing step is the step of polishing the surfaces of the left body piece 2 and the right body piece 3 by means of polishing stone and polishing liquid.

The polishing stone is a combination body of powder having particles with given sizes and is mounted on a hand grinder rotating at a high speed or a polishing machine horizontally reciprocated at a high speed to grind or cut a portion to be removed from the product.

According to the present invention, the polishing stone is used as means for removing the weld beads generated in a process of bonding the left body piece 2 and the right body piece 3 and the residual stress on the surfaces of the left body piece 2 and the right body piece 3, and a size ratio of the polishing stone to the lever is 2:1, thereby shortening polishing time and improving surface roughness.

The polishing solution is made by mixing a 20 g compound per 1 L water, and especially, the compound includes a powder or liquid type compound serving as a stimulant for chemically stimulating physical polishing effects caused by the polishing stone and as a medium for increasing polishing effects, which is used according to a user's selection.

In case of the powder type compound, on the other hand, the polishing solution is made by mixing a 20 to 30 g compound per 1 L water, and the polishing solution is sprayed on the front surfaces of the left body piece 2 and the right body piece 3 to remove impurities therefrom, thereby increasing polishing efficiencies, preventing loading on the polishing stone, and allowing abrasion powder generated from the polishing stone and the door lever to float to the form of bubbles to release the impacts between the polishing stone and the door lever.

In the process of producing the polishing liquid using the powder type compound, for example, if an amount of compound to be mixed per 1 L water is decreased, the impact releasing effects are reduced, so that the impurities remaining on the polishing stone and the surfaces of the left body piece 2 and the right body piece 3 cannot be perfectly removed.

If the polishing stone has corners like triangle or square, further, the corners are rounded to transform the door lever molded into a previously set shape, and accordingly, the polishing stone desirably has a shape of a circle. At this time, the circular polishing stone is made of a stainless steel material having higher softness and strength by one or more steps than the stainless steel used for the door lever, thereby maintaining the nature of the door lever, performing rapid polishing, and generating no rust in the polishing process according to the characteristics of the stainless steel to achieve the improvement in the quality of product and easiness in the management of product and to provide economical advantages for the user.

The water removing step is the step of spraying ethanol onto the front surfaces of the left body piece 2 and the right body piece 3, evaporating the ethanol together with water remaining on the surface onto which the ethanol is sprayed, and thus removing the water remaining on the front surfaces of the left body piece 2 and the right body piece 3.

That is, a method for removing the water with hot wind injected at a given temperature is carried out inconveniently by changing positions at which the hot wind is injected due to the hairline slit and the curved surface of the door lever. Accordingly, the ethanol having excellent vaporization power is coated onto the entire surface of the left body piece 2 and the right body piece 3 to evaporate the water remaining thereon, and further, the bacteria remaining thereon and on surrounding portions are evaporated, so that through the water removing step according to the present invention, a high quality of door lever can be made.

As described above, the door lever according to the present invention enables the stainless steel that is difficult in machining except casting to be easily molded by means of pressurizing molding using the press mold to maximize production efficiencies and to provide excellent corrosion resistance.

Further, the weld beads and the residual stress on the surfaces of the left body piece and the right body piece, which are generated in the process of bonding the left body piece and the right body piece by means of welding, are removed through the hairline finishing, and the left body piece and the right body piece welded to each other are submerged into the sodium hydroxide solution to remove the foreign substances and oil components. While the polishing liquid made by mixing the water and the compound is being sprayed onto the bonded portion of the left body piece and the right body piece, next, the bonded portion is polished by means of the polishing stone, and the ethanol is sprayed onto the finally polished front surfaces of the left body piece and the right body piece to induce the evaporation thereof, thereby simultaneously achieving water removal and antibacterial treatment. Accordingly, the hairline is uniformly formed on the welded portion of the door lever to improve the outer appearance of the door lever.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing a door lever, the method comprising:
   a press machining step of individually machining a left body piece and a right body piece made of a stainless steel material by a press machine;
   a body arrangement step of arranging the left body piece and the right body piece press-machined to face each other;
   a manipulator interposing step of placing a manipulator in a space between the left body piece and the right body piece facingly arranged in such a manner as to be interposed between front ends of the left body piece and the right body piece;
   a body contacting step of positioning the left body piece and the right body piece so that the left body piece and the right body piece come into close contact with each other through the manipulator; and
   a body coupling step of performing welding on the boundary between the left body piece and the right body piece contacted with each other in such a manner as to allow the left body piece and the right body piece to be formed unitarily with each other to surround the manipulator,
   wherein:
   in the press machining step, the stainless steel material is one selected from austenitic stainless steel STS304, ferritic stainless steel STS430, and martensitic stainless steel STS410;
   in the body coupling step, the welding on the boundary between the left body piece and the right body piece comprises one selected from shielded metal arc welding, inert gas tungsten arc welding, inert gas metal arc welding, and welding of chrome-nickel stainless steel; and
   the body coupling step further comprises a body post-machining step of allowing the welded portion to be subjected to solution treatment at a temperature of 1100 to 1200° C. or heated to 850° C. or under and subjected to quenching to form a hairline on the welded portion, spraying a polishing liquid onto an entire surface of the hairline, and polishing the sprayed surface to a depth of 5 to 10 µm; and
   the body post-machining step comprises: a degreasing step of submerging the left body piece and the right body piece into a 0.5 M sodium hydroxide solution maintained to a temperature of 60 to 70° C. to remove foreign substances and oil components from the left body piece and the right body piece;
   a polishing step of spraying a polishing liquid made by mixing a 20 g compound per 1 L water onto the bonded portion between the left body piece and the right body piece and removing burrs generated on the bonded portion and residual stress on surfaces of the left body piece and the right body piece by a polishing stone; and
   a water removing step of spraying ethanol onto the left body piece and the right body piece completely polished to induce an evaporation of the ethanol and thus to perform a water removal and an antibacterial treatment.

* * * * *